United States Patent [19]

Duffy

[11] Patent Number: 5,224,564
[45] Date of Patent: Jul. 6, 1993

[54] HYDROSTATIC POWER STEERING SYSTEM

[75] Inventor: James J. Duffy, Livonia, Mich.

[73] Assignee: Ford Motor Company, Dearborn, Mich.

[21] Appl. No.: 705,415

[22] Filed: May 24, 1991

[51] Int. Cl.$^5$ .............................................. B62D 5/06
[52] U.S. Cl. ...................... 180/132; 180/142
[58] Field of Search ............... 180/132, 141, 142, 143, 180/148, 149; 91/375 A; 137/625.65, 625.69

[56] References Cited

U.S. PATENT DOCUMENTS

| | | | |
|---|---|---|---|
| 3,463,261 | 8/1969 | Runkle et al. | 180/133 |
| 3,708,030 | 1/1973 | Ueda | 180/79.2 R |
| 4,365,683 | 12/1982 | Adams | 180/132 |
| 4,570,735 | 2/1986 | Duffy | 180/142 |
| 4,616,727 | 10/1986 | Kircher et al. | 180/142 |
| 4,645,026 | 2/1987 | Adams | 180/132 |
| 4,665,697 | 5/1987 | Dantlgraber | 60/418 |
| 4,666,013 | 5/1987 | Shibahata et al. | 180/141 |
| 4,669,568 | 6/1987 | Kervagoret | 180/142 |
| 4,711,315 | 12/1987 | Kitamura | 180/132 |
| 4,751,977 | 6/1988 | Cordiano | 180/132 |
| 4,760,892 | 8/1988 | Duffy | 180/142 |
| 4,828,067 | 5/1989 | Duffy | 180/142 |
| 5,012,881 | 5/1991 | Yokote et al. | 180/140 |

FOREIGN PATENT DOCUMENTS

| | | |
|---|---|---|
| 2915890 | 11/1980 | Fed. Rep. of Germany . |
| 3006509 | 8/1981 | Fed. Rep. of Germany . |
| 3724136 | 2/1988 | Fed. Rep. of Germany . |
| 2204540 | 11/1988 | United Kingdom . |

Primary Examiner—Robert P. Olszewski
Assistant Examiner—Florian Zeender
Attorney, Agent, or Firm—Roger L. May; Raymond L. Coppiellie

[57] ABSTRACT

A power steering system for controlling the dirigible wheels of an automotive vehicle includes a pump that develops a pressure in an accumulator, the pump being deactivated when accumulator pressure reaches a predetermined range and being activated when the accumulator pressure is lower than that range, a pressure distributor steering valve situated between a power steering motor and the accumulator that responds to a directional steering torque to distribute directional steering pressures to the motor and a solenoid valve under the control of a microcomputer that establishes a steering pressure that is determined by the torque, vehicle speed and pressure characteristics stored in the memory portion of the microcomputer.

4 Claims, 3 Drawing Sheets

HYDROSTATIC POWER STEERING SYSTEM

TECHNICAL FIELD

This invention relates to a control system for automotive vehicles wherein steering effort is controlled electronically in accordance with sensed operating variables.

BACKGROUND OF INVENTION

My invention is adapted especially for use in a rack-and-pinion power steering gear, although it is capable of being used also with other kinds of fluid pressure assisted steering gear mechanisms.

It is conventional practice in prior art steering gear mechanisms to use a rotary valve in a fluid circuit between a power steering pump and a fluid pressure operated motor that is adapted to deliver steering power assist to the steering linkage of an automotive vehicle. The pump in such arrangements usually is a positive displacement pump. A pressure valve control and a flow control valve cooperate with the pump to form a pump assembly.

The flow control valve is adapted to bypass fluid from the discharge side of the pump to the pump reservoir on the inlet side of the pumping chambers, the amount of bypass flow directed from the flow delivery passage to the inlet side of the pump increasing as the driven speed of the pump increases. The flow control valve responds to changes in pump speed either to increase the bypass flow or to decrease it depending upon whether the pump speed increases or decreases. Thus, the effective output flow of the pump is constant throughout a large range of pumping speeds.

The constant flow that thus is delivered to the steering valve results in a steering pressure in the fluid motor for the steering gear mechanism that is proportional to the reciprocal of the square of the effective flow area established by the steering valve. This relationship between steering pressure and valve flow area is expressed by the following equation:

$$P = \frac{K(Q^2)}{A^2},$$

where Q is the flow per unit of time and A is the effective flow area. If it is assumed that Q is a constant throughout the operating range of speeds of the pump, the equation can be expressed in terms of area and a new constant $K_1$ as follows:

$$P = \frac{K_1}{A^2}$$

In rotary valves for power steering gear mechanisms of this kind, an inner valve member is surrounded by a valve sleeve, the sleeve being disposed in a steering gear valve housing. A driver-operated steering shaft functions as a torque input shaft for the steering gear mechanism and is connected to the inner rotary valve element. The sleeve is connected mechanically to a drive pinion for a rack-and-pinion steering gear mechanism. The pinion is connected directly to the steering torque input shaft through a torsion bar which flexes through an angular displacement that is directly related to the magnitude of the steering torque. Thus, when a given steering torque is applied to the input shaft, the torsion bar will be deflected, which results in a relative rotary displacement of the inner valve member with respect to the valve sleeve.

This valve action changes the flow area for the fluid supplied by the pump. The flow rate of the fluid, as mentioned previously, is constant throughout the pump speed range. As a result of the constant flow and the variable area, the steering pressure changes in accordance with the formula expressed above.

Provision is made for distributing the variable steering pressure to opposite sides of a fluid motor in order to obtain a power assist.

In steering gear mechanisms of this kind, the pump is continuously subjected to a pressure differential because of the requirement that the discharge flow be maintained at a useful value that is high enough to provide the required steering assist under a variety of steering conditions. The pump thus creates a relatively large parasitic power loss for the engine because it is driven by the engine crankshaft.

A belt and pulley usually are used in a torque transfer drive between the pump and the crankshaft; but in some instances, the pump is driven directly by the engine crankshaft. The relatively large parasitic losses involved in driving the power steering pump is one of the disadvantages that I have overcome with my present invention. I also have simplified the overall power steering system and have adapted it for packaging in the powertrain compartment of a vehicle with an economy of space that would not be possible with a conventional power steering system.

DISCLOSURE OF THE INVENTION

The improved power steering mechanism of my invention is part of a hydrostatic system in which the power source is a pressure accumulator that is charged by a power steering pump driven by a vehicle engine. The displacement of the pump is small compared to a pump that would be required for a steering system in which power steering fluid is supplied at a constant rate through a variable area steering valve.

The pressure developed by the pump is stored in an accumulator. Provision is made, when the accumulator pressure reaches a predetermined value, for interrupting torque delivery from the engine to the pump. When the accumulator pressure falls below a threshold value, the pump will be reactivated, thus restoring the accumulator pressure to the range of values for which the system is designed The establishment and disestablishment of the driving connection between the engine and the pump can be achieved, for example, by a disengagable clutch that responds to an appropriate signal triggered by changes in the pressure of the accumulator. In the alternative, the pump may be driven by an electric motor independently of the vehicle engine. The motor in turn can be controlled by a pressure activated switch which responds to accumulator pressure. The switch is disposed in the electric motor circuit.

The accumulator discharges into the steering valve through a solenoid valve which normally is closed. The steering valve in turn normally is vented to a tank through the solenoid valve when a solenoid actuator for the solenoid valve is deactivated.

The steering valve has flow control lands with a small degree of underlap when the valve is in the "on-center" position. It thus vents all of the steering gear seals to reduce the overall friction of the system and to improve the returnability of the steering gear to the "straight ahead" position when steering torque is relaxed by the vehicle operator When a steering maneuver is initiated by the driver, the driver input torque is sensed by a steering torque sensor. A microcomputer receives the signal developed by the torque sensor as well as a speed signal developed by a vehicle speed sensor. The microcomputer receives also a pressure signal developed by a pressure sensor which indicates the steering pressure developed in the steering gear. The microcomputer includes a memory portion in which is stored a function which sets forth the relationship of the desired steering pressure versus steering torque characteristic for each vehicle speed. Each value for steering torque for a given speed thus corresponds to an optimum value for the steering pressure.

A central processing unit in the microcomputer receives the pressure signal, the torque signal and speed signal inputs and selects from memory the appropriate steering pressure, compares it to actual pressure and delivers a pressure correction signal value to a driver portion of the microcomputer. The driver portion develops a solenoid signal for the solenoid pressure control valve to permit a controlled delivery of fluid from the accumulator to the steering gear motor, thus increasing the steering pressure in accordance with the information that is fetched from the memory of the microcomputer.

The steering valve of my invention, unlike the steering valve for conventional rack-and-pinion steering gear mechanisms of the type discussed above, is a pressure distributor valve rather than a pressure regulator valve. Although the flow area for the steering valve will change, this does not affect the magnitude of the steering pressure. It merely affects the distribution of pressurized fluid to the right-turn portion of the fluid motor or the left-turn portion, depending upon the direction of the valve adjustment and the direction of steering torque exerted by the vehicle operator.

BEST MODE FOR CARRYING OUT THE INVENTION

Figure 1:
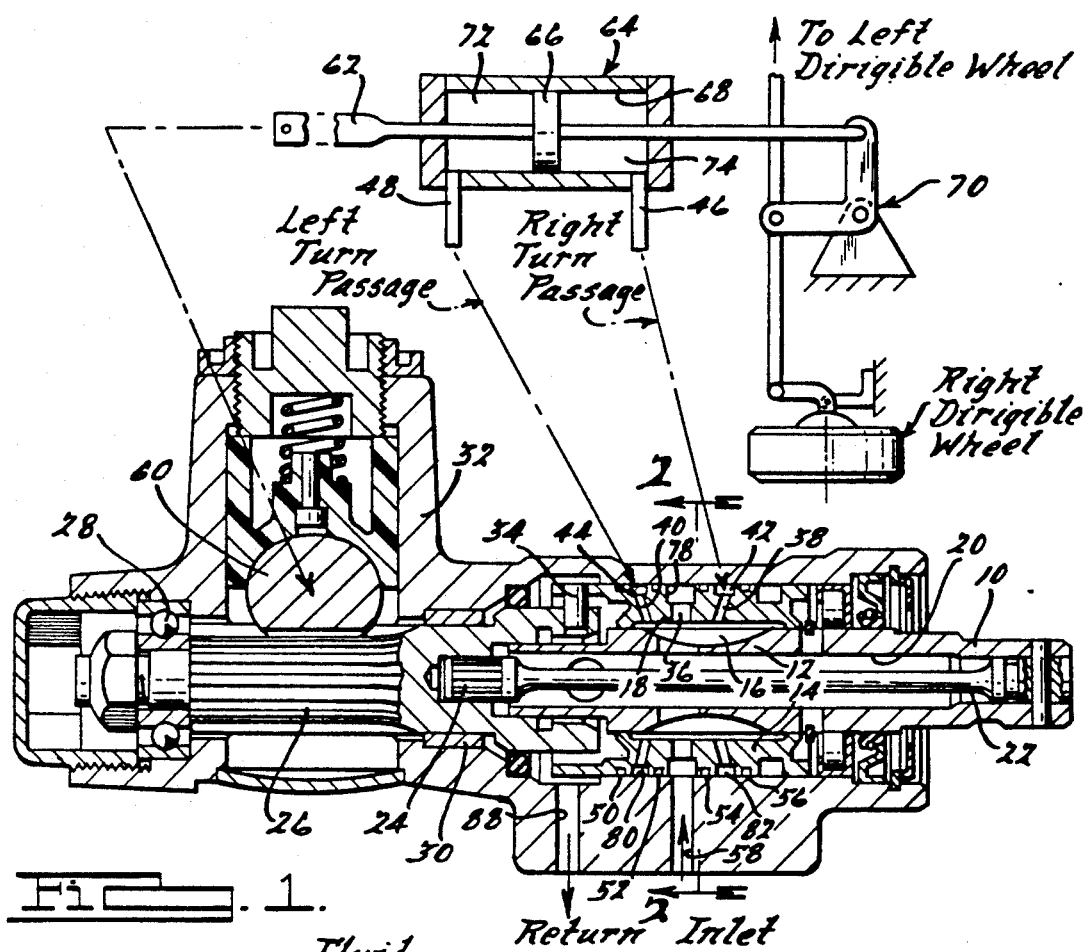
FIG. 1 is a cross-sectional assembly view of a steering gear of the rack-and-pinion type including a cross-sectional view of a rotary valve mechanism for controlling the steering gear.

In FIG. 1, reference numeral 10 designates a driver-operated steering shaft which acts as a torque input shaft for the steering gear mechanism. It is formed integrally with an inner rotary valve member 12, which is disposed in a rotary valve sleeve 14. The inner valve member 12 is provided with external valve lands 16 which register with internal valve lands 18 formed in the sleeve 14.

Inner valve element 12 and the shaft 10 are provided with a central opening 20 through which a torsion bar 22 extends. The right end of torsion bar 22 is pinned to the torque input shaft 10 so that they rotate together The left end of torsion bar 22 is splined at 24 to the right end of pinion 26, which is journalled by straddle-mounted bearings 28 and 30 in the steering gear housing 32.

Pinion 26 is connected by means of a coupling pin 34 to the rotary valve sleeve 14 so that the valve sleeve follows the rotary motion of the pinion 26 as torque is applied to the pinion through the torsion bar 22. Since the inner valve 12 is integral with the input shaft 10, any displacement of the torsion bar 22 due to the input torque applied to it will result in a relative displacement of the inner valve member 12 with respect to the valve sleeve 14. Such relative rotary adjustment of the inner valve relative to the sleeve 14 will cause a change in the angular disposition of the external valve lands 16 with respect to the internal valve lands 18.

The valve lands 16 and 18 control flow distribution from a pressurized fluid inlet passage 36 in the valve sleeve 14 and each of two pressure distributor passages 38 and 40 in the valve sleeve. Passages 38 and 40 communicate with pressure ports 42 and 44 in the housing 32. These ports respectively communicate with the right-turn passage 46 and the left-turn passage 48. Fluid seals 50 and 52 are disposed in seal rings on opposite axial sides of passage 40 to isolate passage 40 from the inlet passage 36. Similarly, fluid seals 54 and 56 are disposed on each axial side of the passage 38 to isolate the passage 38 from the inlet passage 36.

Passage 36 communicates with port 58 forming the housing 32. This port communicates with the discharge side of the pump as will be explained with reference to FIG. 3.

External gear teeth on the pinion 26 driveably engage rack gear teeth on gear rack 60. Gear rack 60 is connected to a piston rod shown schematically at 62. A fluid motor 64, shown generally at 64, is comprised of piston 66 and working cylinder 68 surrounding piston 66. Piston 66 is connected to piston rod 62 which in turn is connected to the right and left dirigible wheels for the vehicle through a suitable steerage linkage mechanism shown schematically at 70.

Cylinder 68 and the piston 66 cooperate to define opposed pressure chambers 72 and 74, which respectively communicate with left-turn passage 48 and right-turn passage 46.

Figure 2:
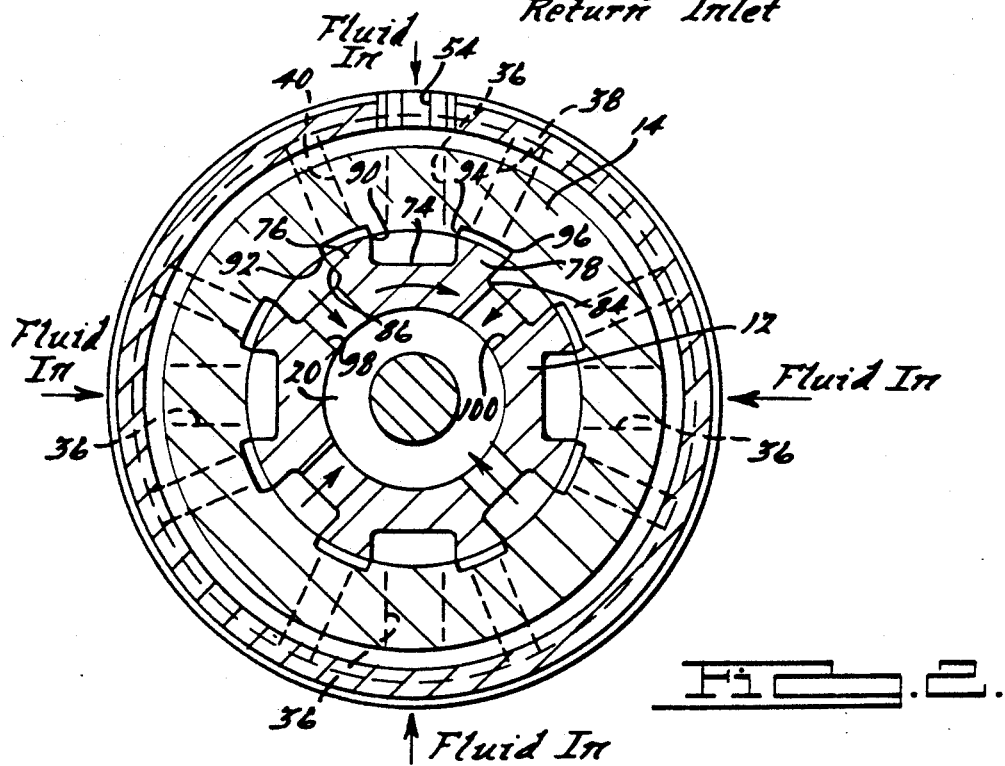
FIG. 2 is a cross-sectional view of a rotary valve assembly for use in the steering mechanism of FIG. 1.

As seen in the cross-sectional view of FIG. 2, there are four inlet passages 36 in the valve sleeve. These are located ninety degrees out of position, one with respect to one another. Each inlet passage 36 communicates with one of the spaces 74 in the inner valve member located between adjacent external valve lands 76 and 78. Each valve land 76 controls the degree of communication between one of the inlet passages 36 and left-turn passage 40, and each valve land 78 controls the degree of communication between one of the inlet passages 36 and the right-turn pressure passage 38. The passages 36 are in fluid communication, one with respect to the other, through annular groove 78 formed in the outer periphery of the valve sleeve 14. Similarly, left-turn passages 40 are in fluid communication through an annular groove 80 formed in the sleeve 14, and right-turn passages 38 are in fluid communication through an annular groove 82, also formed in the outer periphery of the valve sleeve 14.

The interior of the inner valve member forms a passage 20, as explained previously. This passage 20 is in communication with space 84 formed in the inner valve element 12 adjacent land 78. Similarly, space 86 is formed in the inner valve member 12 directly adjacent land 76. Each of these spaces 84 and 86 communicates with the passage 20 as fluid is returned through flow return port 88 in the housing 32. Port 88 communicates with the return side of the pump as will be explained with reference to FIG. 3.

External valve land 76 on the inner valve member 12 registers with a cooperating valve land 90 in the valve sleeve. It also registers with an internal valve land 92 formed in the valve sleeve adjacent space 86. Similarly, external valve land 78 registers with internal valve lands 94 and 96 formed in the valve sleeve directly adjacent land 78. Internal valve lands 90 and 92 are formed in the valve sleeve directly adjacent spaces 86 and 74.

The external valve lands 78 and 76 are formed with a small underlap with respect to their registering internal valve lands. To illustrate this more clearly, we have shown in FIG. 5 a schematic representation of the valve sleeve and the inner valve element unwrapped in linear disposition rather than in rotary disposition.

Space 86 communicates with the central passage 20 through radial port 98. A corresponding radial port 100 extends from the space 84 through the central passage 20. The pressure in the flow return circuit is designated as $P_3$ in FIG. 5.

A small underlap exists between the registering internal valve lands and external valve lands, thus permitting fluid flow from the inlet port 102' to each of the radial ports 98 and 100 when the inner valve element is in a central position corresponding to straight driving. This facilitates piston return when steering torque on the steering shaft is relieved.

Figure 4:
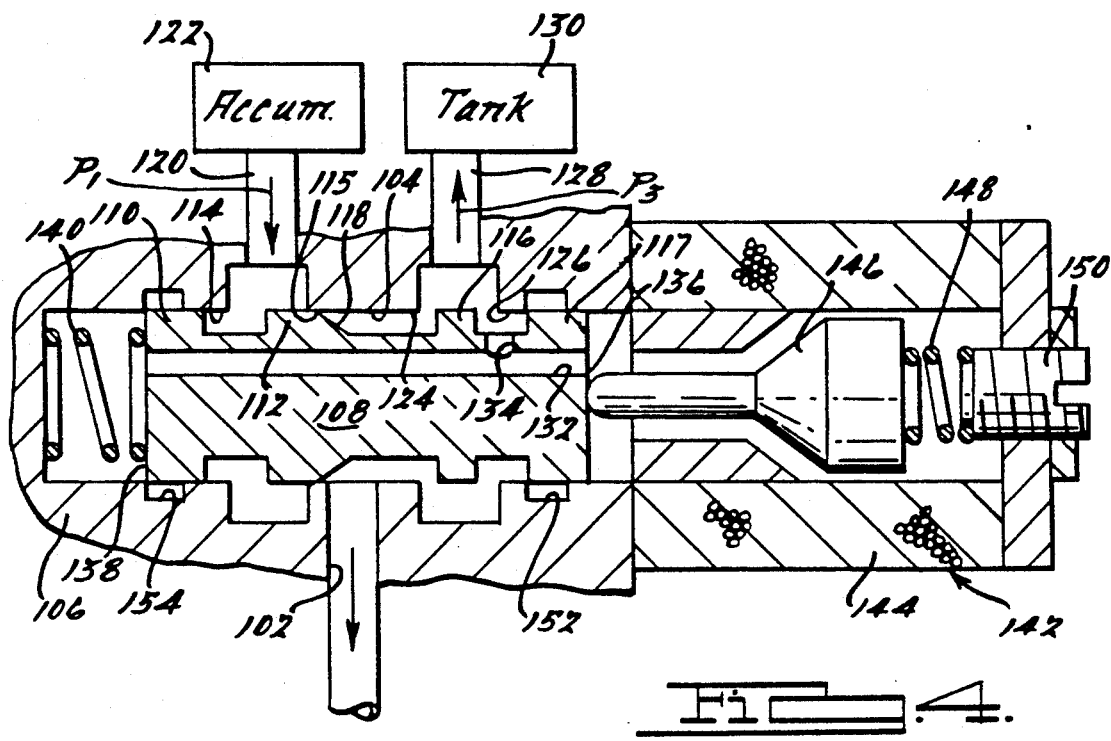
FIG. 4 is a schematic cross-sectional view of a solenoid pressure control valve.
Figure 5:
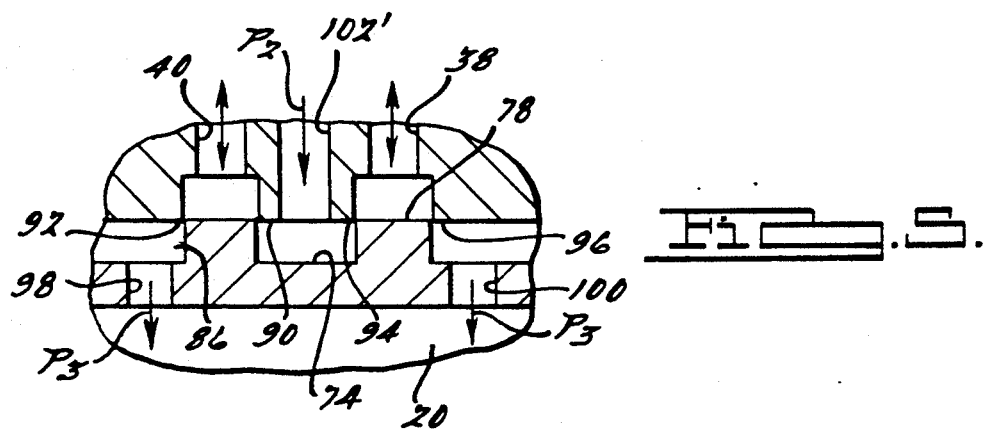
FIG. 5 is a schematic cross-sectional view of a steering valve spool and sleeve.

Port 102', as seen in FIG. 5, communicates with pressure supply passage 102, seen in FIG. 4, which communicates in turn with a solenoid pressure control valve chamber 104 formed in a solenoid pressure control valve housing 106. The pressure in passage 102 port 102' is designated by symbol $P_2$. Slidably disposed in the valve chamber 104 is a valve spool 108 which has four axially spaced external valve lands 110, 112, 116 and 117. Valve land 112 cooperates with internal valve lands 114 and 115.

Valve land 112 is tapered as shown at 118 to provide a gradual rate of change of area for the fluid flow that occurs across the valve lands as the valve spool 108 is shifted in the left-hand direction. This provides a controlled degree of communication between passage 102 and passage 120 which extends to an accumulator, schematically designated by reference character 122 The pressure in accumulator 122 is designated by symbol $P_1$.

External land 116 registers with internal lands 124 and 126 formed in the valve chamber 104 The space between the lands 124 and 126 communicates with passage 128, which extends to a fluid supply tank 130. The area between external land 116 and internal land 124 establishes a variable flow area that is decreased upon adjustment of the valve spool 108 in a left-hand direction. Valve spool 108 is provided with a central opening 132 Which communicates through port 134 with passage 128, thereby distributing tank pressure $P_3$ to the right side 136 and to the left side 138 of the valve spool 108. Thus, the pressure forces acting on the valve spool 108 in an axial direction are balanced A main spring 140 acts on the left end 138 of the valve spool 108, thus tending normally to urge the valve spool 108 in a right-hand direction. A solenoid 142 actuates the valve spool 108 in a left-hand direction. Solenoid 142 comprises solenoid windings 144 and solenoid armature 146, the latter being held in engagement with the right end 136 of the valve spool 108 by trim spring 148. The tension on the trim spring is adjustable by means of an adjusting nut 150, the latter providing a spring seat for the trim spring 148. As the current in the solenoid increases, the axial force exerted by the armature on the valve spool 108 in a left-hand direction is increased.

A dirt vent groove 152 is formed in the chamber 104 adjacent land 126. Similarly, a vent groove 154 is formed in valve opening 104 directly adjacent land 114. Vent grooves 152 and, 154 normally are closed by external valve lands 117 and 110, respectively Dirt tends to accumulate in the dirt vent grooves 152 and 154. When the spool 108 is adjusted in a right-hand direction, vent groove 154 becomes uncovered by the land 110, thus allowing discharge of accumulated dirt in the groove 154 into the tank return flow path defined in part by passage 132 and the radial port 134. Similarly, when the valve spool 108 is adjusted in a left-hand direction, dirt vent groove 152 becomes uncovered, thereby permitting any accumulated dirt in the groove to be discharged into the tank flow return circuit. Thus, dirt will not accumulate in the valve grooves to cause sticking of the inner valve member relative to the internal valve lands.

Figure 3:
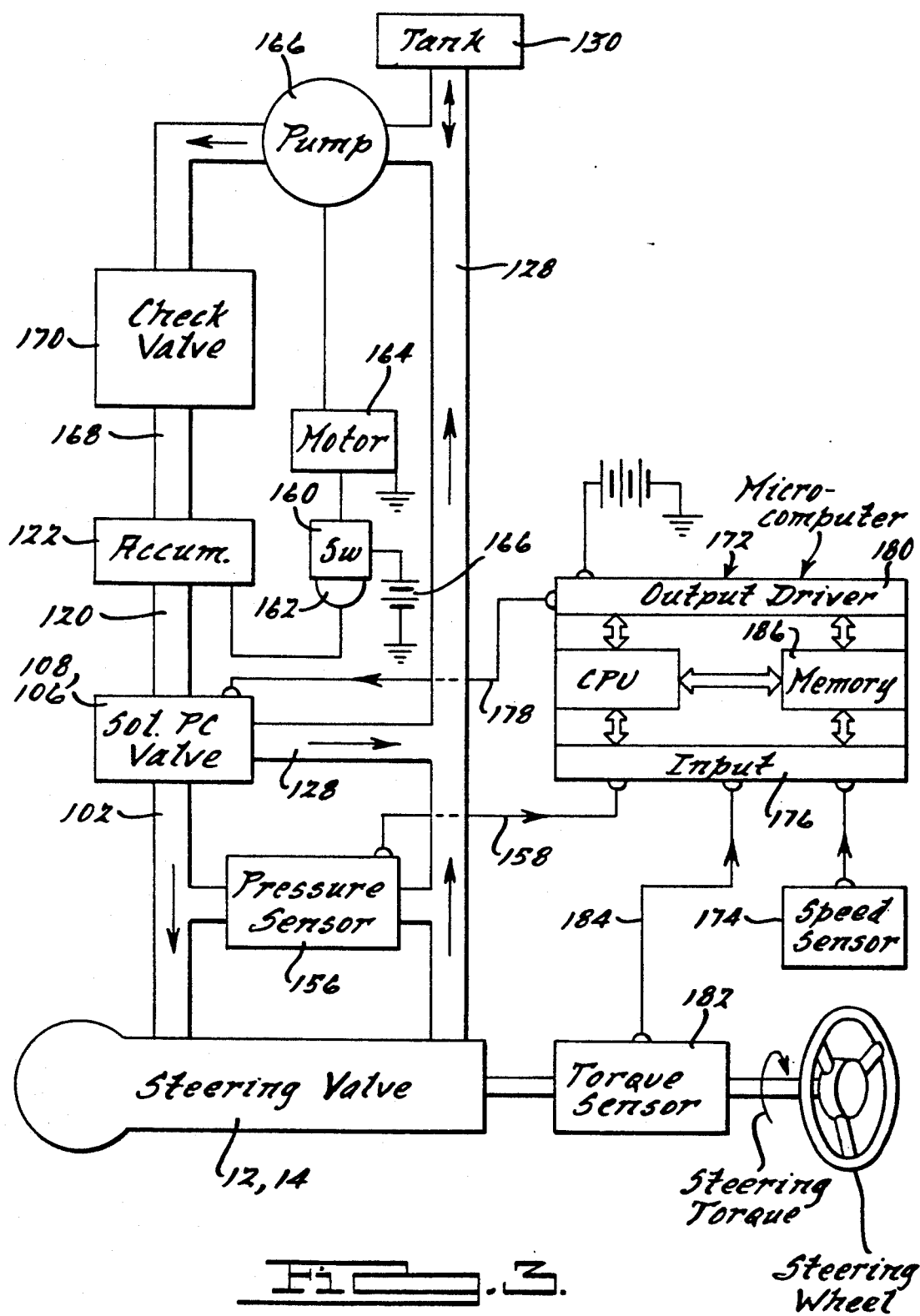
FIG. 3 is an overall schematic diagram of a power steering system, including schematic representations of the microcomputer and the sensors for measuring pressure, torque and speed.

As seen in FIG. 3, a pressure sensor 156 is disposed between the supply passage 102 extending from the solenoid pressure control valve and the tank return passage 128. This pressure sensor may be of a known variety of pressure-to-voltage transducers. It is capable of establishing a signal in lead 158 that is proportional in magnitude to the pressure that is delivered to the steering valve from the solenoid pressure control valve.

A pressure-activated switch 160 includes a fluid pressure activator 162 which responds to accumulator pressure to open and close a power steering pump motor drive circuit for drive motor 164.

A power steering pump 166 is driven by the motor 164. The motor circuit is opened and closed by the switch 160, which is located in series with a voltage supply 166. When the accumulator pressure falls below a predetermined value, the switch 160 opens, thus deactivating the pump. The accumulator is supplied with fluid from the pump 166 through a passage 168. A check valve 170 is located in the passage 168 in series relationship with respect to the accumulator and the solenoid pressure control valve thus permitting the accumulator to remain pressurized when the pump is deactivated.

The signal developed by the pressure sensor 156 is distributed through line 158 to microcomputer 172. In a similar fashion, a vehicle speed sensor 174 distributes a speed signal through the input signal conditioning portion 176 of microcomputer 172. An output driver portion which includes voltage supply and amplifiers, provides a signal through lead 178, Torque sensor 182 develops a signal that is proportional to the steering torque applied to the input shaft 10. This torque signal of the torque sensor 182 is distributed to the input conditioning portion 176 of the microcomputer through line 184.

Figure 6:
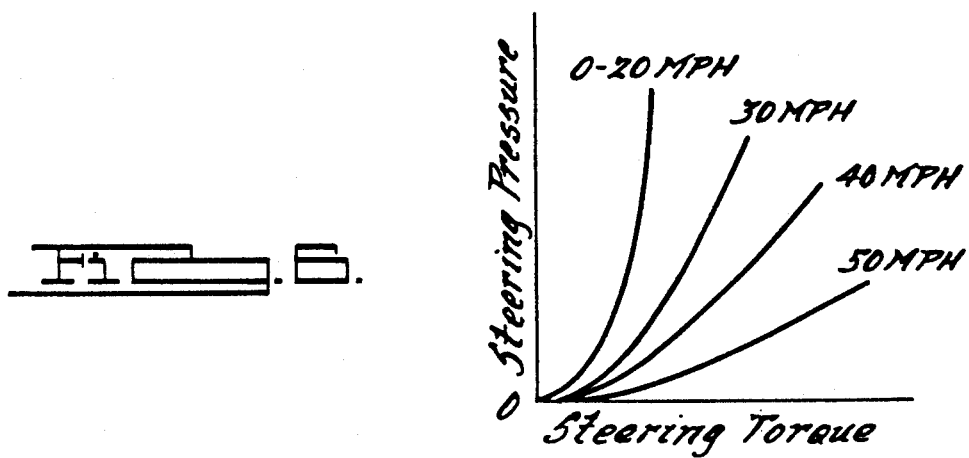
FIG. 6 is a chart showing the relationship between torque, steering pressure and vehicle speed. The relationship between these variables is stored in the memory of the microcomputer illustrated schematically in FIG. 3.

A memory portion 186 of the microcomputer has stored in its registers predetermined steering torque characteristics, which are illustrated in FIG. 6. FIG. 6 shows the functional relationship between steering pressure and steering torque for a range of vehicle speeds. Although the family of curves shown in FIG. 6 specifically designates vehicle speeds at 10 m.p.h. increments, the relationship of torque and pressure stored in the memory exists also for speed values intermediate those shown in FIG. 6.

The input signal conditioning portion 176 of the microcomputer receives speed and torque signals and addresses a register in memory that corresponds to the particular values for the speed and torque. The central processor portion (CPU) of the microcomputer has a pointer that points to a memory register containing pressure data and fetches from memory steering pressure data that is related to the input signals in accordance with the functional relationship illustrated in FIG. 6. That pressure data is processed by the CPU in its processor section as it produces a pressure signal that is distributed to the driver circuit, which develops a current input for solenoid 142. The commanded steering pressure then is established by solenoid 142. After the steering pressure is established by the solenoid pressure control valve, the steering valve functions to distribute that pressure to either steering pressure chamber 72 or 74 of the power steering fluid motor 64 depending upon the direction of the steering torque applied to the input shaft 10.

The steering pressure control valve will respond to the steering pressure developed by the software program for FIG. 6 to gradually admit fluid to the steering piston from the accumulator. Unlike conventional steering systems, the flow from the pump is not a constant flow. The steering valve does not develop a pressure that depends upon a variable flow area through the valve lands. Thus the steering valve merely acts as a pressure distributor. The tapered portion 118 of the land 112 will cause a gradual port area rate of change. That feature, and a high spring rate for the main spring 140 create valve stability.

Having described a preferred embodiment of my invention, what I claim and desire to secure by U.S. Letters Patent is:

1. A hydrostatic power steering system for controlling dirigible wheels of a motor vehicle comprising a steering gear mechanism having a steering shaft, a torque output gear and a fluid motor with double-acting working fluid chambers;

a power steering fluid pump, a power steering valve having relatively adjustable valve elements with registering valve lands that define first and second variable fluid pressure distributor valve areas, one valve element being connected to said steering shaft and the other valve element being connected to said torque output gear, a right-turn pressure passage connecting one of said fluid chambers to said first valve area and a left-turn pressure passage connecting another of said chambers to said second valve area;

a pressure accumulator communicating with the discharge side of said pump, motor means for powering said pump, means responsive to the attainment of a predetermined pressure range in said accumulator for deactivating said motor means and for activating said motor means when the pressure in said accumulator is lower than said predetermined range;

a solenoid pressure control valve means in communication with said accumulator and with said steering valve for distributing steering pressure to said steering valve;

an electronic processor unit including memory registers adapted to store a programmed functional relationship between steering torque, steering pressure and vehicle speed;

a steering torque sensor adapted to develop a torque signal indicative of the steering torque applied to said steering shaft;

a pressure sensor adapted to develop a pressure signal indicative of said steering pressure; and a vehicle speed sensor adapted to develop a signal indicative of vehicle speed;

said processor unit communicating with each of said sensors and adapted to develop a voltage input for said solenoid pressure control valve means in accordance with said programmed functional relationship.

2. The combination as set forth in claim 1 wherein said solenoid pressure control valve comprises a valve spool with external lands disposed in a valve sleeve with internal lands, a first set of said internal and external lands defining a variable-area fluid pressure distribution port providing a pressure delivery passage between said accumulator and said steering valve, a second set of said internal and external lands providing a low pressure flow return passage between said accumulator and the low pressure side of said pump;

an electrical solenoid having an armature adapted to apply a valve actuating force to said valve spool; and means for energizing said solenoid in response to variations inn the values of the signals developed by said sensors whereby an optimum power steering assist is developed by said steering system in accordance with said programmed functional relationship.

3. The combination as set forth in claim 2 wherein one valve land of said first set of valve lands has a modified geometry whereby the rate of change or the effective area of said variable-area fluid pressure distribution port is reduced for each incremental displacement of said valve spool relative to said valve sleeve.

4. A power steering system for controlling dirigible wheels of a vehicle comprising:

a fluid pressure pump, a fluid pressure accumulator adapted to be pressurized by said pump, a solenoid-operated pressure control valve located in a fluid flow circuit that includes also a pressure distributor steering valve adapted to be controlled by an operator;

a bi-directional fluid motor means with opposed pressure working chambers for adjusting said wheels, said distributor valve being in fluid communication with said accumulator and with said opposed fluid pressure working chambers of said fluid motor means whereby a controlled pressure differential in said working chambers is established;

steering torque sensor means, vehicle speed sensor means and steering pressure sensor means for developing steering torque, vehicle speed and steering pressure signals, respectively;

an electronic microcomputer having a central processor unit including a data processor section, a memory portion, an output driver portion and a data input portion, said memory portion being adapted to store a programmed functional relationship between steering torque, steering pressure and vehicle speed whereby a steering pressure signal is developed by said central processor unit in said driver portion in response to sensed values of steering torque and vehicle speed;

each of said sensor means being connected to said data input portion, said output driver portion being connected to said solenoid-operated pressure control valve;

said solenoid operated pressure control valve comprising a valve spool with external lands disposed in a valve sleeve with internal lands, a first set of said internal and external lands defining a variable fluid pressure distribution port providing a pressure delivery passage between said accumulator and said steering valve, a second set of said internal and external lands providing a low pressure flow return passage between said accumulator and the low pressure side of said pump;

an electrical solenoid having an armature adapted to apply a valve actuating force to said valve spool; and means for energizing said solenoid in response to variations in the values of the signal developed by said sensors whereby an optimum power steering assist is developed by said steering system in accordance with said programmed functional relationship.

* * * * *